United States Patent

[11] 3,540,454

[72] Inventors Harry L. Giebelstein
De Witt, and
Demeter Gawreluk, Davenport, Iowa
[21] Appl. No. 801,501
[22] Filed Feb. 24, 1969
[45] Patented Nov. 17, 1970
[73] Assignee J. I. Case Company
Racine, Wisconsin
a corporation of Wisconsin

[54] SYSTEM FOR DETERMINING COMBINE EFFICIENCY
10 Claims, 6 Drawing Figs.
[52] U.S. Cl. .................................................. 130/27,
56/1, 73/432
[51] Int. Cl. ............................................ A01f 12/00
[50] Field of Search ............................................ 130/27.19,
24, 20, 26; 56/1; 73/425.2, 214, 432, 518, 519,
520, 521, 522; 302/6; 141/110; 221/(Inquired)
222/226/(Inquired). 271/(Inquired); 47/9

[56] References Cited
UNITED STATES PATENTS

| | | | |
|---|---|---|---|
| 2,617,425 | 11/1952 | Dion .............................. | 130/24 |
| 2,869,284 | 1/1959 | Abernathy et al. ............ | 47/9 |
| 2,887,226 | 5/1959 | Angus .......................... | 130/24 |
| 3,427,790 | 2/1969 | Flittie .......................... | 130/20 |

Primary Examiner—Antonio F. Guida
Attorney—Settle, Batchelder and Oltman

ABSTRACT: An ejector mechanism for selectively dropping canvases along the path of a harvesting machine for receiving the effluent of the machine to be utilized in determining the efficiency of the harvesting operation.

INVENTORS
HARRY L. GIEBELSTEIN.
DEMETIS GAWRELUK.
BY SETTLE, BATCHELDER & OLTMAN.
ATT'YS.

Patented Nov. 17, 1970

3,540,454

INVENTORS
HARRY L. GIEBELSTEIN.
DEMETIS GAWRELUK.
BY
SETTLE, BATCHELDER & OLTMAN.
ATT'YS.

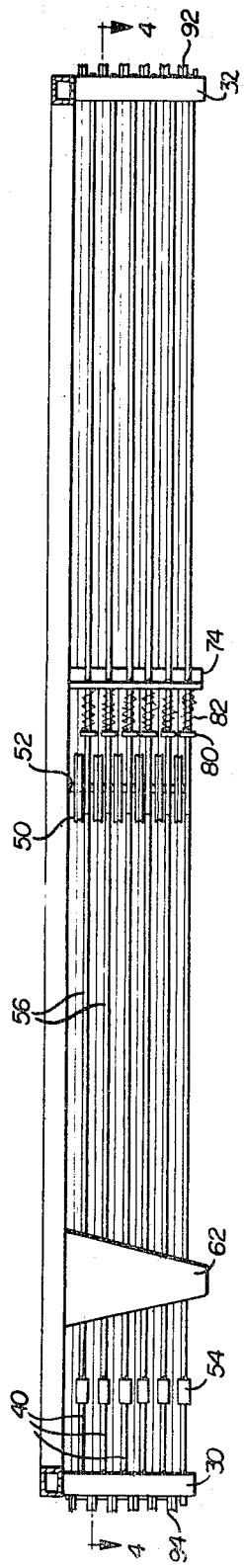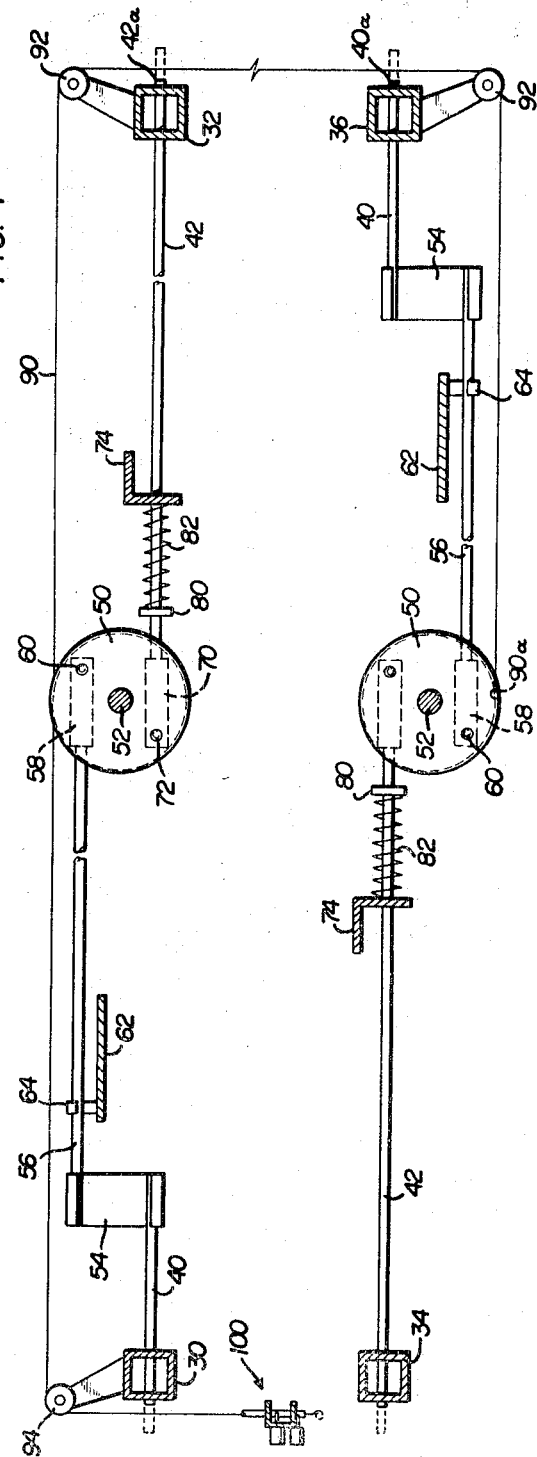

3,540,454

1

SYSTEM FOR DETERMINING COMBINE EFFICIENCY

BACKGROUND OF THE INVENTION

The present invention relates generally to harvesting machines and more particularly to an improved mechanism for collecting effluent material to be utilized in determining machine efficiency.

Field testing of complete prototype machines prior to being introduced into the market has been a conventional procedure for many years in various industries. For example, harvesting machines, such as combines, generally are tested for, among other things, determining performance of a particular machine by comparing the performance of the prototype machine with what may be termed a standard machine.

The performance tests include determining the amount of grain loss for a particular machine during varying conditions and for most crops. Determinations of grain losses due to harvesting and more particularly due to the machine are generally made by taking samples of the straw discarded from the machine to determine the amount of grain which is discarded by the machine.

One conventional type method of sampling is to locate some type of imperforate member on the ground to collect a certain amount of straw effluent material which is subsequently passed through another separating machine to accurately determine grain losses. Several mechanical mechanisms have been proposed for collecting samples of the harvested material as it is passed from the machine.

One such mechanism is attached to the rear end of the machine and has large bags attached thereto which may be intermittently located in the path of the harvested material to collect the material to be checked. However, such type of catcher has not proven too successful since it requires a separate man to locate the catcher and the machine must subsequently be stopped to remove the catcher or bag after a sample has been taken.

Furthermore, in such type of device it is absolutely necessary that the distance travelled be accurately measured so that an accurate determination of grain losses may be made. Of course, any downtime on a prototype machine of this type is extremely costly and should be avoided if at all possible.

SUMMARY OF THE INVENTION

According to the present invention, an automatic ejector mechanism has attached thereto a plurality of individual canvases each of which is separately connected to a frame forming part of the mechanism and which may be automatically ejected by the operator of the vehicle.

Thus, the primary object of the present invention is to provide an ejector mechanism for a harvesting machine which is capable of automatically locating catcher members on the ground just ahead of the rear end of the machine during travel.

Another object is to provide an ejector mechanism which is capable of selectively releasing individual canvases to be utilized for collecting samplings of harvested material.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is a vertical sectional view taken generally along lines 3-3 of FIG. 2;

FIG. 4 is a sectional view taken generally along lines 4-4 of FIG. 3;

2

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
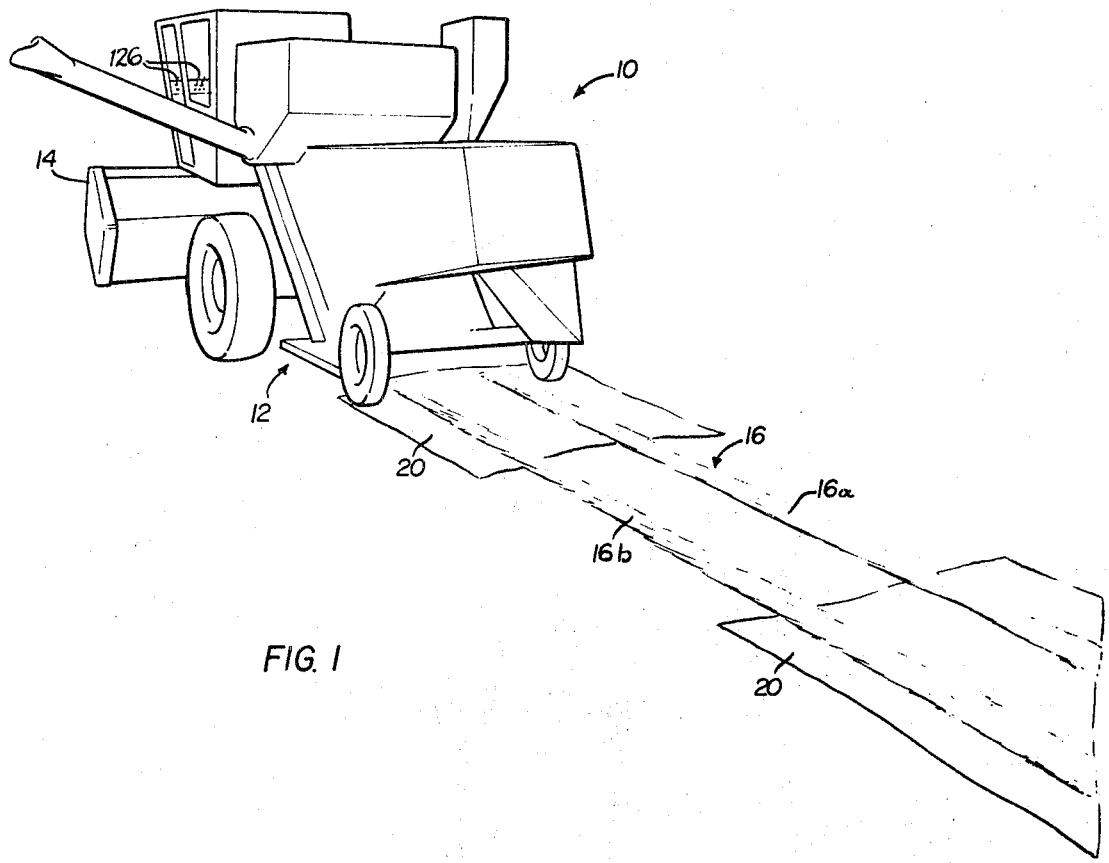
FIG. 1 is a perspective view of a conventional harvesting machine having the present invention incorporated therein.

FIG. 1 of the drawings shows a conventional harvesting machine 10 having the ejector mechanism 12 of the present invention attached thereto. Since the harvesting machine is of the conventional type no detailed description thereof appears to be necessary. Suffice it to say that the material to be harvested is collected by the header 14 and passed through the main body of the machine where the grain is separated from the harvested material and the harvested material or effluent 16 is passed from the rear end of the machine and deposited on the ground.

The effluent or straw may be divided into two separate groups 16a and 16b with one row of material representing the straw passed over the conventional straw walkers forming a part of the harvesting machine and the second row of material may be the material discarded by the cleaning shoe also forming a conventional part of the harvesting machine.

As was indicated above it is necessary to take random samplings of the harvested material which is passed through the combine to determine the amount of grain remaining therein thus determining the grain losses for a particular machine and this is generally accomplished with a catcher. Of course, it is necessary to locate the canvases or catchers in the path of travel of the harvesting machine after the header has cut the material being harvested and just ahead of the point where the straw is discarded by the machine. This necessitates locating the catchers under the machine which must necessarily be moving at the time so that an accurate reading or sampling is obtained.

It is readily apparent that such an operation is extremely unsatisfactory from a safety point of view as well as being objectionable from the standpoint of efficiency. One or more persons must throw the canvases under the machine and insure that the canvas is properly located on the ground so as to get an accurate sampling.

According to the present invention, an ejector mechanism or means is connected to the harvesting machine between the header and the discharge opening of the machine. The ejector mechanism is capable of selectively releasing individual canvases 20 just ahead of the discharge opening while the machine is traveling along the field. Preferably, the ejector mechanism is operable by a remote control located in the operator's compartment of the vehicle, as will become apparent hereinafter.

Figure 2:
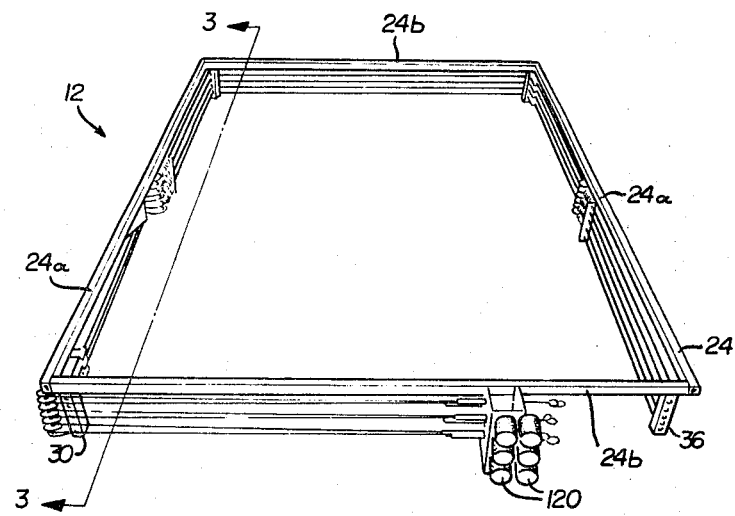
FIG. 2 is a perspective view of the ejector mechanism of the present invention.

FIG. 2 of the drawings generally discloses the ejector mechanism 12 comprising a substantially rectangular frame 24 having longitudinal frame elements 24a and end elements 24b. The frame is adapted to have a plurality of individual canvases or catchers 20 connected thereto and releasable individually. For this purpose, each corner of the rectangular frame 24 has a depending support member respectively designated 30, 32, 34 and 36 with each member having a plurality of vertically aligned openings 38. Each of the openings 38 in members 30 and 36 slidably receives an end 40a, a rod 40 or equivalent member while the openings 38 in support members 32 and 34 each slidably receive the ends 42a of rods 42.

One end of each of the rods 40 is connected to a pulley 50 rotatably supported on shaft 52 depending from the lower surfaces of the respective longitudinal frame and members 24a. The connections for the rods 40 each include a bracket 54 defining an axial offset from the axis of the rods 40 with one end of a second rod 56 connected to the bracket 54. The free end of the rod 56 is connected through a coupling 58 to an eccentric 60 on the pulley 50. Preferably, guide means are provided for the respective rods 56 and in the illustrated embodiment the guide means includes a depending flange 62 having a plurality of spaced guide elements 64 one for each of the respective rods 56.

The rods 42 are also connected to the pulleys 50 through a coupling 70 at an eccentric 72. The eccentric connection 72 is diametrically opposed from the eccentric connection 60 and is located at equal radial distance from the shaft 52, for a purpose to be described later. Again, the respective rods 42 preferably have guide means intermediate the ends thereof and in the illustrated embodiment the guide means include brackets 74 depending from the lower surface of the longitudinal frame elements 24a with each of the brackets having an appropriate number of openings for slidably receiving the respective rods 42.

The free ends 40a and 42a of the respective rods 40 and 42 which are slidably received in the depending members are normally biased to a first position substantially in alignment with the outer peripheral surface of the respective depending members 30 through 36. For this purpose, the rods 42 have collars 80 secured thereto at a point spaced from the brackets 74. The collars or abutment members 80 have one end of a compression spring 82 in engagement therewith while the opposite end of each of the springs 82 is in contact with a surface of the bracket 74. Thus, the springs 82 normally rotate the pulleys 50 clockwise to a position where the rod ends 40a and 42a are disposed within the depending members.

Means are provided for rotating the respective pulleys 50 against the action of the respective springs 82 to extend the respective ends 40a and 42a of the rods or attaching means 40 and 42. In the illustrated embodiment, the actuating means for each group of rods 40 and 42 includes a cable 90 having one end 90a connected to one pulley 50 and extending around said pulley. The cable is then trained over cable guides 92 respectively supported by the members 36 and 34. The cable 90 thereafter is extended around the opposite associated pulley 50 and continues along the longitudinal side member 24a to the corner having depending member 30 where the cable is again trained over a cable guide 94. The opposite end of the cable is secured to a releasing means 100.

Figure 5:
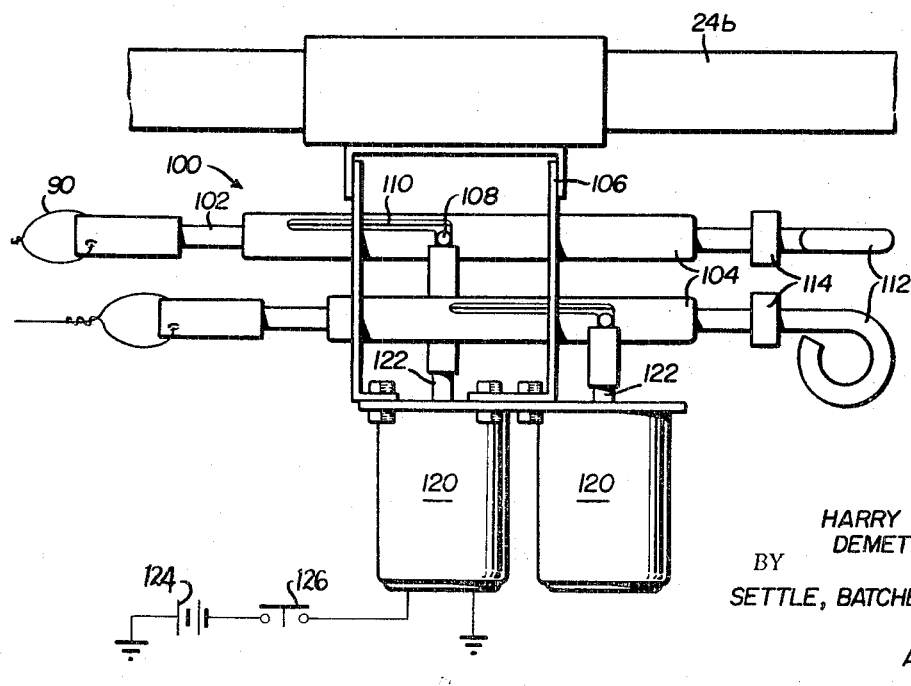
FIG. 5 is an enlarged fragmentary view of the release mechanisms forming part of the ejector.

As shown in FIG. 5, the releasing means 100 includes a shaft 102 connected to the free end of the cable and slidably supported in a sleeve 104 supported on a bracket 106 fixedly secured to the end member 24b. The shaft 102 has a radially extending pin 108 which is guided in an L-shaped slot 110 formed in the sleeve 104 with the longitudinal portion of the slot extending axially of the sleeve. The opposite end of the shaft 102 has a member 112 defining a holding means for manually presetting the member, as will be explained hereinafter. Also, a fixed abutment stop 114 is carried by the shaft 102 and is adapted to engage the end of the sleeve 104 when the releasing mechanism is actuated to limit the amount of clockwise rotation of the pulleys 50.

The actuating mechanism for activating the release member includes a conventional solenoid 120 having a core 122, the free end of which is in alignment with the L-shaped portion of the slot 110 and contacts the radially extending pin 108. The solenoid is adapted to be actuated by a conventional battery 124 and a switch 126 located in the operator's compartment of the combine.

Figure 6:
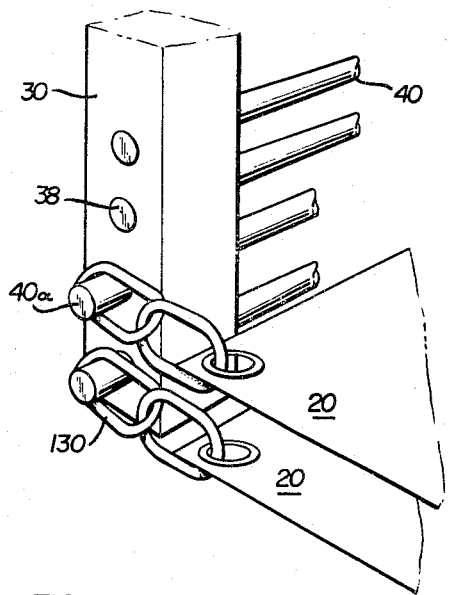
FIG. 6 is an enlarged perspective view of one corner of the ejector mechanism.

The respective canvases or catchers 20 are attached to the ejector mechanism through links 130 connected to each corner of each canvas. As shown in FIG. 6, the respective links are looped or telescoped over the ends 40a and 42a of the respective rods 40 and 42 when the rods are moved to the extended position, as will be explained hereinafter.

In connecting or attaching the respective canvases 20 to the ejector mechanism, the ends 40a and 42a of a single group of rods for holding one canvas are extended beyond the surface of the respective members 30 through 36 by manually grasping the holding means 112 on the shaft 102 and moving the holding means rightward as viewed in FIG. 5 against the action of the respective springs 82 associated with the rods 42. During this sliding movement of the shaft 102 in the sleeve 104, the pin 108 is moved longitudinally in the slot 110 until it reaches the right hand extreme end whereby counterclockwise rotation of the shaft 102 will locate pin 108 in the transverse portion of the slot 110 in the position shown in FIG. 5. With the respective rods 40 and 42 in the extended position as shown in FIG. 6, the end link 130 associated with each corner of a particular canvas is telescoped over the end of the rod in the manner shown in FIG. 6. The relative dimensions of the frame and the respective canvases and associated links are such that the links cannot be removed from the rod ends 40a and 42a without axial movement of the respective rods.

In the illustrated embodiment of FIG. 6, only two of the canvases are shown connected to the ejector mechanism but it is readily apparent that any number may be attached and the number of course is dependent upon the number or groups of rods and associated elements provided on the ejector mechanism.

The selected number of canvases are attached to the ejector mechanism which of course is secured to the frame structure of the harvesting machine 10 and the machine is then ready for a test run. While the machine is traveling along the field, the operator thereof may selectively release the lowermost canvas by merely momentarily energizing the solenoid 120 associated with the particular canvas through a manual switch 126 located at the operator's compartment of the vehicle. Momentary energization of the solenoid 120 will rotate the pin 108 in slot 110 and also rotate the shaft 102 within sleeve 104 to locate the radially extending pin 108 in the longitudinal portion of the slot 110. Once in the longitudinal portion of the slot 110, the pin can move within the slot and the respective springs 82 associated with each group of attaching means causes a clockwise rotation of the respective pulleys 50 thereby retracting the ends of the rods or pins 40a and 42a to allow the canvas 20 associated therewith to drop by gravity onto the ground as illustrated in FIG. 1 of the drawings. Of course, all of this action occurs while the operator is traveling in the field performing the normal harvesting function. When the discharge end of the combine 10 passes over the canvas on the ground, the effluent material is deposited thereon for subsequent utilization in determining the losses of grain resulting from ineffective separation within the combine.

Of course, subsequently the material on the canvases is gathered and the discharge material is again passed through a separator mechanism to determine the amount of grain remaining therein.

From the above description it is readily apparent that the present invention provides a safe and effective way of depositing catching mechanisms for determining harvesting efficiency of a particular machine. The ejector mechanism of the present invention can readily be incorporated in any combine to be tested and the entire mechanism is operated from the conventional operator's compartment of the machine while the machine is in operation.

We claim:

1. In combination with a harvesting machine having means for separating grain from harvested material and a discharge opening for discharging the remainder of the harvested material after the separation, a frame carried by said machine, a plurality of canvases individual attaching means for releasably securing said canvases to said frame and releasing means connected to each attaching means for selectively releasing individual canvases from said frame to be deposited on the ground whereby said discharged harvested material is deposited on said canvases for subsequent processing to determine the harvesting efficiency of said machine.

2. The combination as defined in claim 1, in which said attaching means each includes spaced members supported by said frame, rods slidably carried by said members for releasably connecting each canvas to said spaced members, said rods having a first position wherein said canvases are attached to said frame and a second position wherein said canvases are released from said frame, said releasing means when actuated moving said rods from said first to said second position.

3. The combination as defined in claim 1, in which said releasing means each comprises first means normally biasing said attaching means to a first position, second means acting against said biasing means for maintaining said attaching means in a second position wherein said canvases are secured to said frame with said releasing means selectively operable to disengage said second means allowing said biasing means to move said attaching means to the first position for releasing the associated canvas.

4. The combination as defined in claim 1, in which said frame is polygonal with spaced parallel sides, support members on opposite ends of each of said parallel sides for supporting said attaching means, and said attaching means each comprising two pairs of rods respectively extending parallel to each of said spaced sides with a remote end of each of said rods supported on one of said members, first means interconnected adjacent ends of each pair of rods, second means normally maintaining said rods in a first position, and third means selectively engageable with said frame for maintaining said rods in a second position for attaching each said canvas to one attaching means, said releasing means selectively disengaging said third means to release the associated canvas.

5. An ejector mechanism for a member comprising a frame corresponding substantially to the size of said members, spaced guide means on said frame, retaining means carried by each of said guide means and movable between first and second positions, biasing means normally maintaining retaining means in said first position, releasable means holding said retaining means in a second position for connecting said member to said frame, and releasing means selectively actuatable to release said releasing means whereby said biasing means acts to move said retaining means to the first position to disconnect said member from said frame.

6. An ejector mechanism as defined in claim 5, in which said member and frame are rectangular with said guide means comprising depending members connected to each corner of said frame, the further improvement of said retaining means comprising a pair of elements carried by each of two said spaced sides of said frame and each having one end supported by one of said depending members with rotatable means carried by each of said spaced sides respectively interconnecting the opposite end of each pair of elements.

7. An ejection mechanism as defined in claim 6, in which said rotatable means comprises a pulley supported on the associated side of said frame with said elements connected at diametric eccentric points on said pulley, said biasing means interposed between each of said spaced sides and one of said elements carried by said side, said releasable means including a cable trained over each of said pulleys and having a free end attachable to said frame for maintaining said elements in said second position.

8. An ejector mechanism for selectively releasing imperforate members for subsequent utilization in determining the efficiency of a harvesting machine comprising a frame, individual releasable means carried by said frame for connecting each of said imperforate members to said frame and actuating means for each of said releasable means operable to selectively release each of imperforate members.

9. An ejector mechanism as defined in claim 8, the further improvement of said releasable means each comprising an elongated member movable between first and second positions, guide means on said frame slidably supporting one end of said member, rotatable means carried by said frame with the opposite end of said elongated member connected thereto, spring means interposed between said frame and said rotatable means for moving said rotatable means and said elongated member to said first position, and cable means having one end connected to said rotatable means and the opposite end releasably connected to said frame for releasably retaining said rotatable means and said elongated member in said second position to connect the associated imperforate member to said frame whereby activation of said actuating means release the connection of said cable from said frame to allow said biasing means to move said elongated member to the first position releasing said imperforate member.

10. An ejector mechanism as defined in claim 9, in which the harvesting machine includes an operator's station remote from said ejector mechanism, the further improvement of said actuating means comprising a solenoid carried by said frame with switch means disposed in the operator's station to activate said solenoid.